United States Patent
Ruffa

(10) Patent No.: US 9,347,842 B2
(45) Date of Patent: May 24, 2016

(54) WELL CONDUCTOR STRAIN MONITORING

(71) Applicant: Anthony A Ruffa, Hope Valley, RI (US)

(72) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 84 days.

(21) Appl. No.: 14/270,516

(22) Filed: May 6, 2014

(65) Prior Publication Data

US 2015/0322769 A1 Nov. 12, 2015

(51) Int. Cl.
*G01L 1/24* (2006.01)
*G01B 11/16* (2006.01)
*E21B 47/00* (2012.01)

(52) U.S. Cl.
CPC ............. *G01L 1/246* (2013.01); *E21B 47/0006* (2013.01); *G01B 11/16* (2013.01)

(58) Field of Classification Search
CPC ..... D07B 1/147; E21B 47/0006; G01L 1/246; G02B 6/4427
USPC .......................................................... 324/96
See application file for complete search history.

(56) References Cited

U.S. PATENT DOCUMENTS

| | | | |
|---|---|---|---|
| 3,582,848 A * | 6/1971 | Ryder | H01J 29/702 335/212 |
| 5,212,755 A * | 5/1993 | Holmberg | G02B 6/4429 385/104 |
| 5,758,005 A * | 5/1998 | Yoshida | G02B 6/4416 174/40 R |
| 5,845,033 A | 12/1998 | Berthold et al. | |
| 5,925,879 A | 7/1999 | Hay | |
| 6,417,507 B1 | 7/2002 | Malvern et al. | |
| 6,601,458 B1 | 8/2003 | Gysling et al. | |
| 6,601,671 B1 | 8/2003 | Zhao et al. | |
| 6,913,079 B2 | 7/2005 | Tubel | |
| 8,326,540 B2 | 12/2012 | Hull et al. | |
| 2006/0230839 A1 * | 10/2006 | Morrison | E21B 17/015 73/800 |
| 2006/0289724 A1 | 12/2006 | Skinner et al. | |
| 2009/0106949 A1 * | 4/2009 | Rossi | F16B 7/0426 24/16 R |
| 2011/0054808 A1 | 3/2011 | Pearce et al. | |
| 2011/0185807 A1 | 8/2011 | Albrecht et al. | |
| 2014/0232375 A1 * | 8/2014 | Fauveau | H04R 15/00 324/109 |

* cited by examiner

*Primary Examiner* — Paresh Patel
*Assistant Examiner* — Akm Zakaria
(74) *Attorney, Agent, or Firm* — James M. Kasischke; Michael P. Stanley

(57) ABSTRACT

A well conductor strain monitoring system is provided which includes a plurality of fiber optic Bragg grating sensors written onto a single optical fiber. Cable strands are wound around the optical fiber to form an armored cable protecting the fiber. The armored cable is further integrated into a strength cable to provide robustness. This strength cable is then wrapped around the conductor under tension and anchored at both ends. The cable is wound at a prescribed angle so as to have multiple wraps around the conductor. Once tensioned, the cable remains stationary against the conductor and holds a position. The strain gages are spaced along the optical fiber, such that the strain gages are oriented 90 degrees apart when the cable is wrapped about the conductor. This orientation supports the estimation of bending in any direction.

2 Claims, 3 Drawing Sheets

WELL CONDUCTOR STRAIN MONITORING

STATEMENT OF GOVERNMENT INTEREST

The invention described herein may be manufactured and used by or for the Government of the United States of America for governmental purposes without the payment of any royalties thereon or therefor.

This application claims the benefit of U.S. Provisional Patent Application No. 61/849,429; filed on Jun. 26, 2013 by the inventor, Dr. Anthony Ruffa and entitled "SUBSEA WELL CONDUCTOR STRAIN MONITORING".

CROSS REFERENCE TO OTHER PATENT APPLICATIONS

None.

BACKGROUND OF THE INVENTION (1) Field of the Invention

The present invention relates to measuring strain and bending stresses in a well conductor, and more particularly to a plurality of Bragg gratings written onto an optical fiber that is integrated into an armored cable wrapped around the well conductor.

(2) Description of the Prior Art

The well conductor is a primary structural member for a well. As such, it is necessary to accurately understand the loadings that the well conductor is subjected to. Deformation of the conductor can result in significant misalignment of the well axis and production from the well can be lost.

To monitor the loadings and deformation; measurements must be taken along the length of the conductor. However, attaching sensors directly to the conductor can result in damage to the sensors. What is needed is a system for measuring bending stress in the well conductor without attaching sensors directly to the conductor. The system should also be sufficiently rugged so as to withstand the anticipated loadings. In addition, the system should have sufficient capacity to provide measurement data from the full length of the well conductor.

SUMMARY OF THE INVENTION

Accordingly, it is an object of the present invention to provide a system for measuring bending stresses in a well conductor, wherein sensors of the system are protected from damage when the well conductor is subjected to loads.

It is another object of the present invention to provide a measurement system capable of withstanding anticipated loadings on the well conductor.

It is a still further object of the present invention to provide a well conductor measurement system with the capacity to provide stress measurement data from the full length of the conductor.

In accordance with these and other objects made apparent hereinafter, a well conductor strain monitoring system is provided. The system includes a plurality of fiber optic Bragg grating sensors capable of measuring strain. The Bragg gratings are written onto a single optical fiber. The optical fiber is integrated into a steel or synthetic cable that is wrapped around the well conductor.

The cable consists of steel strands wound around a core containing the optical fiber to form an armored cable to protect the optical fiber. The armored cable is further integrated into a larger steel or synthetic strength cable to sustain the anticipated loads on the conductor. For example, a ⅜" steel cable can withstand working tensions in the thousands of pounds, and is sufficiently ruggedized to protect the fiber from damage.

The strength cable is then wrapped around the conductor under tension and anchored at both ends. The cable is wound at a prescribed angle so as to have multiple wraps around the conductor. Accordingly, the cable clamp fixtures are oriented at a low helical angle.

The cable clamps can be either welded directly to the conductor, or secured to a worm gear clamp having a galvanized or stainless steel band with slots, similar to a common hose clamp. Once tensioned, the cable remains stationary against the conductor and holds a position. Strain gages are spaced along the optical fiber, such that the strain gages are oriented 90 degrees apart when the cable is wrapped about the conductor. This orientation supports the estimation of bending in any direction.

In one embodiment, a conductor strain monitoring system includes an optical fiber. A plurality of evenly spaced Bragg grating sensors can be formed on the fiber. A plurality of cables can be wound about the optical fiber to form a measurement cable.

The measurement cable is helically wound and tensioned about the conductor at a helical angle. The spacing of the Bragg gratings and the helical angle are configured such that the measurement cable is held in position relative to the conductor and the Bragg grating sensors are spaced radially 90 degrees apart about the conductor.

The cables include armoring cables wound about the optical fiber and strength cables wound about the armoring cables. A first clamp secures a first end of the measurement cable to the conductor and a second clamp secures the opposite end of the measurement cable to the conductor.

At least one of the clamps is disposed on the well conductor at the aforesaid helical angle. One or both of the clamps can include a captive screw and a band having threads thereon. The measurement cable is fixed to the band. The screw engages the threads such that rotation of the screw moves the band and the measurement cable in a direction parallel to a longitudinal axis of the measurement cable.

In one embodiment, the armoring cables are fabricated from either steel or Kevlar. The strength cables may be fabricated from either steel or Kevlar. Also, at least one of the clamps can be configured as a hose clamp.

In one embodiment, a conductor strain monitoring system includes an optical fiber having a plurality of Bragg grating sensors formed thereon. The grating sensors are spaced evenly along a length of the optical fiber. A plurality of armoring cables can be wound about the optical fiber. A water block material encases the armoring cables and a plurality of strength cables can be wound about the armoring cables.

The optical fiber, the armoring cables, the water block and the strength cables form a measurement cable. The measurement cable is helically wound and tensioned about the conductor at a angle such that the measurement cable is held in position relative to the conductor and the grating sensors are spaced radially 90 degrees apart about the conductor.

The system includes a first clamp securing a first end of the measurement cable to the conductor and a second clamp securing a distal end to the conductor. At least one of the first or second clamps is disposed on the conductor at the aforesaid helical angle. One or both of the clamps include a captive screw and a band having threads thereon. The measurement cable is fixed to the band. The screw engages the threads such that rotation of the screw moves the band and the measurement cable in a direction parallel to the longitudinal axis the measurement cable.

Other objects, features and advantages of the present invention including various novel details of construction and combinations of parts, will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent, wherein corresponding reference characters indicate corresponding parts throughout the several views of the drawings and wherein.

DETAILED DESCRIPTION OF THE INVENTION

Figure 1:
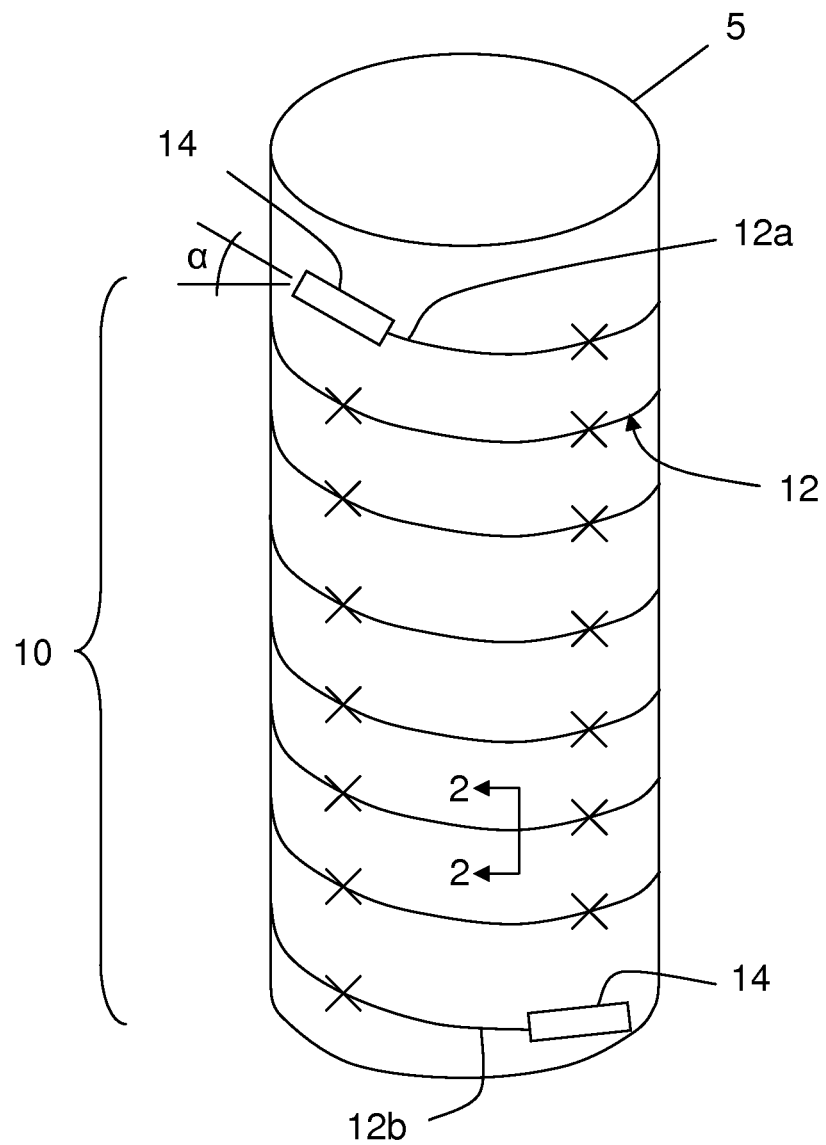
FIG. 1 is a partial isometric view of a well conductor strain measurement system.

Referring now to FIG. 1, there is shown a well conductor 5 having a strain measurement system 10 attached thereto. The strain measurement system 10 includes a measurement cable 12 helically wound on the prior art well conductor 5. The measurement cable 12 is wrapped around the conductor 5 in tension and is secured to the conductor by clamps 14 at respective ends 12a and 12b of the measurement cable.

The clamps 14 can be affixed to the conductor 5, such as by welding. The number of turns of the measurement cable 12 around the conductor 5 is determined by a helical angle $\alpha$ at which the clamps 14 are fixed to the conductor. Once tensioned, the measurement cable 12 will remain stationary against the conductor 5.

Figure 2:
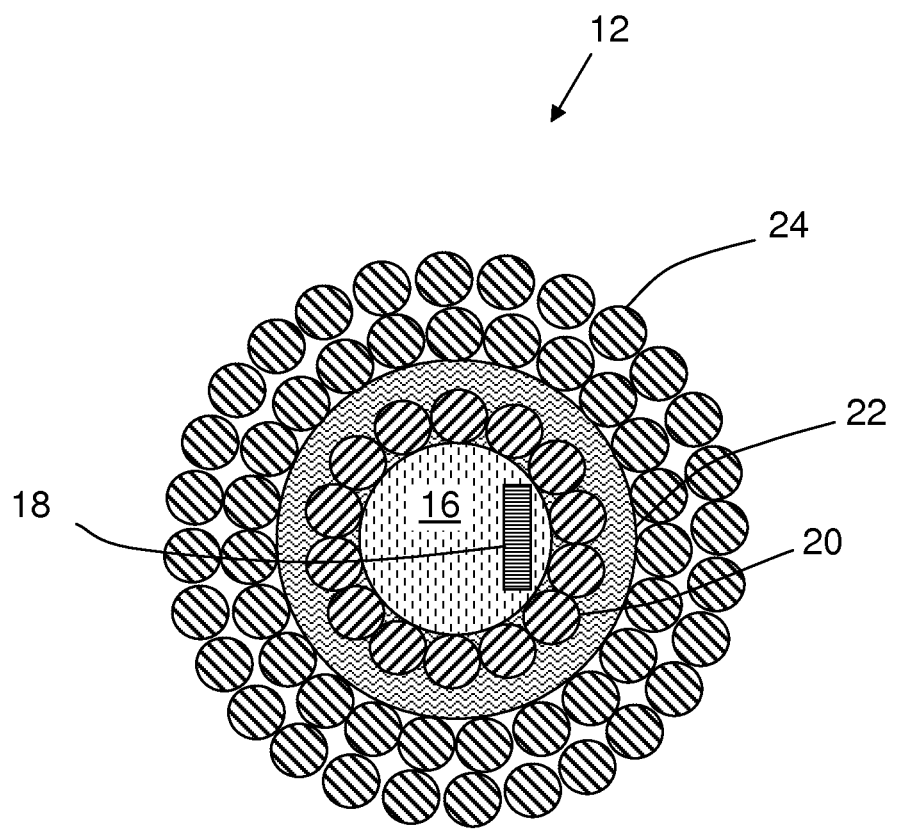
FIG. 2 is a cross-sectional view of an armored and strengthened optical fiber for use in the system of FIG. 1.

Referring now to FIG. 2, there is shown a cross-sectional view of the measurement cable 12 taken at line 2-2 of FIG. 1. An optical fiber 16 forms the core of the measurement cable 12. In a manner known to those of skill in the art, Bragg gratings 18 (one of which is shown schematically in FIG. 2) are written onto the fiber 16. The gratings 18 are spaced evenly along a length of the fiber 16. Spacing of the Bragg gratings 18 along the fiber 16 is based on a helical angle $\alpha$ (FIG. 1), such that the Bragg gratings align along the length of the conductor 5 (as indicated by location marks X in FIG. 1). For measuring bending in each direction; the Bragg gratings 18 are spaced so as to align radially 90 degrees apart on opposite sides of the conductor 5.

The equation for a helix around a right circular cylinder is $x = a \cos \theta;$ $y = a \sin \theta;$ $z = b\theta,$ Here $\alpha$ is the radius of the right circular cylinder, $\theta$ measures angular extent along the circular extent of the cylinder, and $2\pi b$ is the increase in height due to one full helical wrap. The helical angle $\alpha$ is $\alpha = \tan^{-1}(2\pi a/b).$ In a manner known to those of skill in the art, a plurality of the armoring cables 20 (one of which is designated in FIG. 2) are wound around the fiber 16 to protect the fiber from damage. Water blocking material 22 covers the armoring cables 20 and the fiber 16. A plurality of strength cables 24 (one of which is designated in FIG. 2) are wound around the blocking material 22 to provide the strength required to withstand anticipated loadings. Two layers of the strength cables 24 are shown for illustration and not for limitation.

Figure 3:
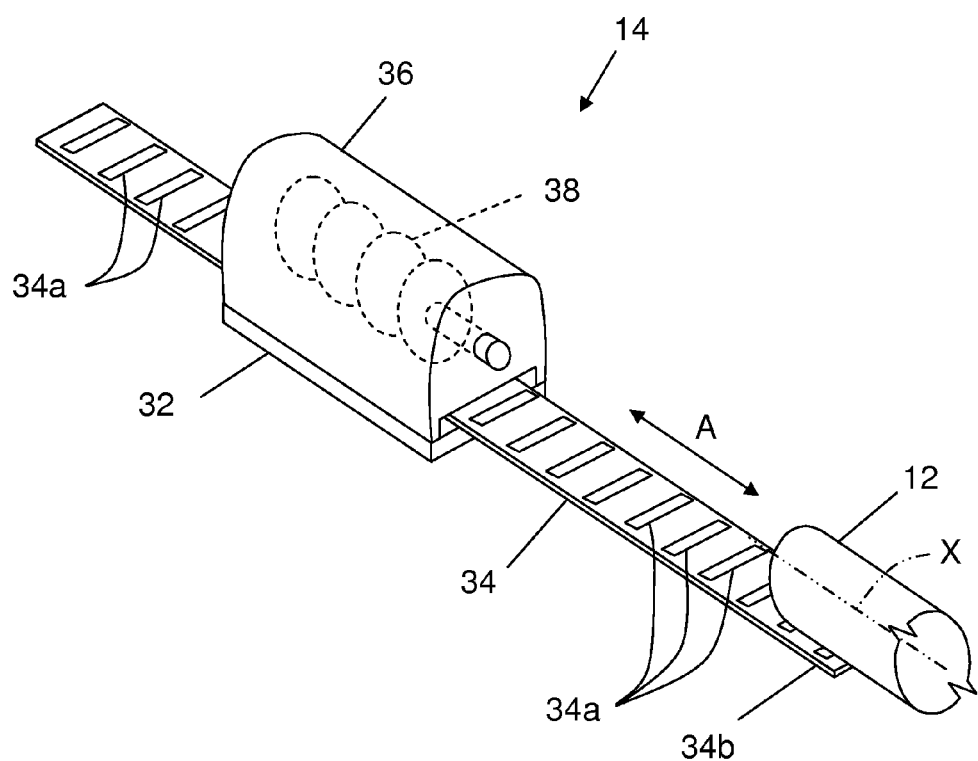
FIG. 3 is a schematic isometric view of a clamp for use in the system of FIG. 1.

Referring now to FIG. 3, there is shown a schematic isometric view of a configuration for clamps 14. It will be understood that the clamps 14 at the ends 12a and 12b may each have different configurations depending on the method used for winding the measurement cable 12 onto the conductor 5. The configuration of the clamp 14 in FIG. 3 is in the manner of well-known hose clamps.

A base 32 of the clamp 14 is fixed to the conductor 5 (not shown in FIG. 3). A band 34 is positioned on the base 32 so as to be movable over the base in the directions shown by double arrow A. A gear housing 36 is positioned over the band 34 and is affixed to the base 32. A screw 38 (shown in phantom in FIG. 3) is rotatably fixed within the housing 36 and engages threads 34a of the band 34 (some of which are designated in FIG. 3). The measurement cable 12 is fixed at an end 34b of the band 34, such that movement in the directions of arrow A is parallel to longitudinal axis X of the measurement cable. As the screw 38 is rotated; engagement of the screw with the threads 34a results in movement of the band 34 over the base 32. Depending on the direction of rotation; the measurement cable 12 can be tensioned about the conductor 5, or loosened for removal from the conductor.

What has thus been described is a well conductor strain monitoring system 10 using a plurality of fiber optic Bragg grating sensors 18 written onto a single optical fiber 16. Armoring cable strands 20 are wound around optical fiber 16 to protect the optical fiber. Armoring cables 20 and optical fiber 16 are further wrapped with strength cables 24 to provide adequate robustness. A layer of water blocking material 22 is placed between the armoring cables and the strength cables.

The composite cable 12 is then wrapped around the well conductor 5 under tension and anchored at both ends by the clamps 14. The cable 12 is wound at a prescribed angle ($\alpha$) so as to have multiple wraps around the conductor 5. Once tensioned, the composite measurement cable 12 remains stationary against the conductor 5 and holds its position. The Bragg grating strain gages 18 are spaced along the optical fiber 16, such that the strain gages 18 are oriented 90 degrees apart when the measurement cable 12 is wrapped about the conductor 5 at an angle $\alpha$.

The cables will be wrapped around the conductor in a helical pattern. The actual bending strain will thus depend on the helical angle. If two cables were along the axis of the conductor, then the bending strain in the plane containing the cables would be the difference in the strains at antipodal points (i.e., oriented 180 degrees apart on the cylinder). However, since the cables are helically wound on the cylinder, the strain along the axis must be computed from the strain measured in the Bragg grating in the helix.

The component of the unit vector tangent to the helix along the axial direction is $b/\sqrt{a^2+b^2}$, so the strain at the antipodal points would be multiplied by this factor and then subtracted to get the bending strain.

The strain gages 18 on opposite sides of the conductor 5 move as the conductor bends; thereby, providing a measure of the bending, once the outputs of opposite strain gages are subtracted in the manner known in the art. The strain gages 18 located at opposite sides of the conductor 5 and spaced 90 degrees apart support the estimation of bending in any direction. The temperature variation across the conductor 5 should be small, such that the effects of temperature should be negligible, being largely subtracted out as well.

Because the strain gages 18 are integrated into the composite measurement cable 12 and not attached directly to the conductor 5, the measurements from the Bragg gratings will need to be calibrated to obtain the true bending of the conductor. As is known in the art, testing in a simulated lab environment can lead to the measurements needed for calibration. Once calibrated, the results obtained from the system 10 should be accurate, since the strain in the fiber 16 will translate directly to the measurement cable 12. The measurement cable 12, once in place under tension, will move with the conductor 5 as the cable bends.

The foregoing description of the preferred embodiments of the invention has been presented for purposes of illustration and description only. It is not intended to be exhaustive or to limit the invention to the precise form disclosed; and obviously many modifications and variations are possible in light of the above teaching. For example, the conductor 5 can be other than a well conductor. The system 10 is compatible with many types of pipes or shafts where strain monitoring is needed without mounting strain gages directly to a conductor.

As a further example, the armoring cables 20 and the strength cables 24 may be fabricated from various materials adequate to protect the fiber 16 and provide strength sufficient to withstand the forces that the conductor 5 is known to be subjected to. Materials can include, but are not necessarily limited to, steel and Kevlar. Additionally, the armoring cables 20 and the strength cables 24 may each be of different materials, again depending on the known forces and environments that the measurement cable 12 will be subjected to.

Also, the clamps 14 can each be configured separately. For example, the measurement cable 12 can be anchored by the clamp 14 (as illustrated in FIG. 3) at the first end 12*a*. The length of the measurement cable 12 can then be wound onto the conductor 5 under moderate tension, and the end 12*b* can be securely anchored to the conductor by means of a simple u-shaped clamp welded directly to the conductor. The screw 38 of the clamp 14 at the end 12*a* can then be rotated to tighten the measurement cable 12 to a final tension.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A well conductor strain monitoring system comprising:
an optical fiber having a plurality of Bragg grating sensors formed thereon, said sensors spaced evenly along a length of said fiber;
a plurality of armoring cables wound about said optical fiber;
a plurality of strength cables wound about said armoring cables, wherein said optical fiber, said armoring and strength cables together form a measurement cable, said measurement cable helically wound and tensioned about the well conductor at a helical angle such that said measurement cable is held in position relative to the conductor, and wherein said grating sensors are spaced radially 90 degrees apart about the well conductor;
a first clamp securing a first end of said measurement cable to the conductor and a second clamp securing a distal end of said measurement cable to the conductor wherein each of said first and second clamps is disposed on the conductor at the helical angle in relation to a longitudinal axis of the conductor:
a captive screw; and
a band having spaced apart threads thereon and wherein the threads are perpendicular to exterior edges of said band, said measurement cable being fixed to said band, said screw engaging said threads such that rotation of said screw moves said band and said measurement cable based on incremental movement on the threads of said band in a direction coincident to a longitudinal axis of said measurement cable.

2. A well conductor strain monitoring system comprising:
an optical fiber having a plurality of Bragg grating sensors formed thereon, said Bragg grating sensors spaced along a length of said optical fiber;
a plurality of armoring cables wound about said optical fiber;
a water blocking encasing said plurality of armoring cables;
a plurality of strength cables wound about said armoring cables, wherein said optical fiber, said armoring cables, said water block and said plurality of strength cables together form a measurement cable, said measurement cable helically wound and tensioned about the well conductor at a helical angle such that said measurement cable is held in position relative to the conductor, wherein said grating sensors are spaced radially 90 degrees apart about the well conductor;
a first clamp securing a first end of said measurement cable to the conductor wherein said first clamp is disposed on the conductor at the helical angle in relation to a longitudinal axis of the conductor;
a second clamp securing a distal end of said measurement cable to the conductor wherein said second clamp is disposed on the conductor at the helical angle in relation to a longitudinal axis of the conductor;
a captive screw; and
a band having spaced apart threads thereon and wherein the threads are perpendicular to exterior edges of said band, said measurement cable being fixed to said band, said screw engaging said threads such that rotation of said screw moves said band and said measurement cable based on incremental movement on the threads of said band in a direction coincident to a longitudinal axis of said measurement cable;
wherein said plurality of armoring cables are fabricated from at least one of steel and Kevlar;
wherein said plurality of strength cables are fabricated from at least one of steel and Kevlar.

* * * * *